United States Patent [19]

Nestich

[11] Patent Number: 4,832,310
[45] Date of Patent: May 23, 1989

[54] FLUSH CONTROL VALVE

[75] Inventor: R. F. Nestich, Glenmont, Ohio

[73] Assignee: Mansfield Plumbing Products, Inc., Perrysville, Ohio

[21] Appl. No.: 233,594

[22] Filed: Aug. 18, 1988

[51] Int. Cl.[4] ................ F16K 31/128; F16K 21/16; F16K 31/48; E03D 3/06
[52] U.S. Cl. .......................... 251/36; 251/39; 251/46; 251/47; 251/54
[58] Field of Search .............. 251/15, 23, 36, 38, 251/39, 42, 47, 48, 51, 54, 55, 45, 46; 137/414

[56] References Cited

U.S. PATENT DOCUMENTS

| | | | |
|---|---|---|---|
| 729,965 | 6/1903 | Schossow et al. | 251/36 |
| 871,859 | 11/1907 | Brooks | 251/36 |
| 1,123,477 | 1/1915 | Brooks | 251/36 |
| 1,162,957 | 12/1915 | Watrous | 251/39 |
| 1,273,140 | 7/1918 | Brooks | 251/36 |
| 1,297,836 | 3/1919 | Gulick | 251/36 |
| 1,385,456 | 7/1921 | Kellan | 251/36 |
| 1,812,301 | 6/1931 | Nasmyth | 251/36 |
| 3,610,280 | 10/1971 | Kitamura | 251/39 |
| 4,227,674 | 10/1980 | Grant, Jr. | 251/36 |

Primary Examiner—George L. Walton
Attorney, Agent, or Firm—Renner, Kenner, Greive, Bobak, Taylor & Weber

[57] ABSTRACT

A flush control valve (10) for metering a predetermined amount of flush fluid, or other liquid, to a facility, such as a urinal, to be flushed. The flush control valve (10) has a push button cap (166) that is actuated to cause the primary valve assembly (33) to open and distribute the flush fluid from the inlet chamber (35) of the flush control valve (10) to the outlet chamber (36) of the flush control valve (10). Depressing the push button cap (166) activates a timing assembly (109), the interior working components of which do not come in contact with the flush fluid controlled by the flush control valve (10), thereby eliminating corrosion to that critical portion of the valve (10). The timing assembly (109) is pneumatically operated and is effective through a diaphragm (108) to actuate a pilot valve assembly (83) which controls the opening and closing of the primary valve assembly (33). By virtue of the interaction between the diaphragm (108) and the stem valve element (79) in the pilot valve assembly (83) and the pressure of the flush fluid within the valve (10), and the control effected by a bleeder sub-assembly (130) in metering the flow of pneumatic fluid from a timing chamber (115) to an energizing chamber (120), the timing assemlby (109) is returned to the unactuated disposition at a rate sensitive to the pressure of the flush fluid so that a substantially constant volume of flush fluid is delivered by the flush control valve (10) over a wide range of flush fluid pressures.

7 Claims, 4 Drawing Sheets

FLUSH CONTROL VALVE

TECHNICAL FIELD

The present invention relates generally to flow control valves. More particularly, the present invention relates to flow control valves of the type particularly suited for flushing urinals. Specifically, the present invention relates to flush control valves in which the timing mechanism is maintained out of contact with the fluid passing through the flush control valve and which can be preset to deliver a predetermined volume of flushing fluid each time it is actuated, irrespective of the pressure at which the fluid is delivered to the flush control valve.

BACKGROUND OF THE INVENTION

Perhaps the most common of the prior known flush control valves for urinals employs a lever, or disk, which serves as the manually operated handle. In these installations the handle may be selectively tilted by the user to initiate a flush. With either type of handle that portion thereof disposed interiorly of the flush control valve engages, or constitutes a component of, the flush actuating and control mechanism. In such prior known arrangements the actuating and control mechanism, including any timing assemblies, is disposed directly within the flow path of the flush fluid as it passes through the flush control valve. Such exposure subjects the actuating and control mechanisms to corrosion and/or accretion of contaminants suspended within, or carried in solution by, the flush fluid. Corrosion and the accretion of contaminants can cause malfunctions or erratic operation of the valve.

Flush control valves for urinals have, heretofore, also widely employed manually operated push buttons to initiate the flush. Here, too, that portion of the push button mechanism disposed within the flush control valve engages, or constitutes a component of, the actuating and control mechanism which lies in direct contact with the flush fluid passing through the flush control valve. The actuating and control mechanisms, including any timing assemblies, of these valves are, therefore, also subject to corrosion and contaminant accretion which can cause malfunctions or erratic operation of the flush control valve.

The vast majority of the prior known flush control valves for urinals, and the like, irrespective of whether they employ manually operated handles, disks or push buttons, utilize an orifice, or other restricted passage, in the timing assembly to effect the timing control for determining the flush cycle. These orifices, or restrictions, have heretofore been routinely disposed within the flow path of the flush fluid and are, therefore, particularly subject to malfunctions caused by particles suspended in the flush fluid. Many prior known flush control valves tacity evidence that their flush cycle timing configurations are subject to such problems by incorporating, or suggesting the use of, filters to reduce the amount of maintenance and to extend the life of the valves.

SUMMARY OF THE INVENTION

It is, therefore, one of the primary objects of the present invention to provide an improved flush control valve having an actuating mechanism which includes a pneumatically operated timing assembly for controlling not only the period of time required for the valve to close after it has opened but also the volume of flush fluid which passes through the valve.

It is another object of the present invention to provide an improved flush control valve, as above, which incorporates a timing assembly, the components of which are maintained out of contact with the flush fluid passing through the valve, the timing assembly incorporating two pneumatic chambers with a flow control arrangement disposed therebetween.

It is a further object of the present invention to provide a flush control valve, as above, which incorporates an improved timing assembly in which an energizing chamber is separated from a timing chamber by a check valve assembly which permits virtually unrestricted flow of pneumatic fluid from the energizing chamber to the timing chamber but which virtually precludes flow from the timing chamber to the energizing chamber.

It is a still further object of the present invention to provide a flush control valve, as above, which incorporates an improved timing assembly in which a bleeder sub-assembly permits the flow of pneumatic fluid from the timing chamber to the energizing chamber at a predetermined, controlled rate.

It is yet another object of the present invention to provide a flush control valve, as above, which incorporates an improved timing assembly that employs a piston means to compress the pneumatic fluid within the energizing chamber and force it through the check valve assembly and into the timing chamber.

It is an even further object of the present invention to provide a flush control valve, as above, which employs a diaphragm to actuate a pilot valve assembly that effects the opening of the primary valve assembly in the flush control valve and conversely utilizes the interaction between the pilot valve assembly and the diaphragm to delay the closing of the primary valve assembly until the parameters by which the flush cycle is determined have been satisfied.

These and other objects of the invention, as well as the advantages thereof over existing and prior art forms, which will be apparent in view of the following detailed specification, are accomplished by means hereinafter described and claimed.

In general, the present invention overcomes the deficiencies of prior known flush control valves by maintining the timing assembly separated from the flush fluid passing through the primary valve mechanism. The timing assembly preferably employs an impermeable diaphragm which comprises the boundary between, and seals, the pneumatic fluid preferably employed within the timing assembly from the flush fluid which passes through the primary valve assembly.

The timing assembly responds to operator input force on a push button cap to transfer pneumatic fluid from a first, energizing chamber into a second, timing chamber. The timing chamber is smaller than the energizing chamber so that a significant pressure increase occurs within the timing chamber as the pneumatic fluid from the energizing chamber is forced into the timing chamber. The diaphragm comprises one wall of the timing chamber which permits the timing chamber to expand and contract in response to the pressure of the pneumatic fluid pressure within the timing chamber.

Accordingly, the diaphragm allows the timing chamber to expand in response to the increased pressure therein. The diaphragm interacts with a pilot valve assembly which effects opening and closing of the primary valve assembly. Specifically, expansion of the timing chamber forces the diaphragm into engagement with the stem portion of a stem valve element in the pilot valve assembly. The stem portion is loosely received within a guide tube so that displacement of the diaphragm against the stem portion effects axial translation of the stem valve element within the guide tube. As the stem valve element of the pilot valve assembly is thus translated, a passage is opened which effects a pressure imbalance on the diaphragm valve element in the primary valve assembly. The pressure imbalance on the diaphragm valve element in the primary valve assembly opens the primary valve assembly to permit substantially unrestricted flow of flush fluid between the inlet and outlet chambers in the flush control valve.

When the push button cap is released, the relative pressures between the energizing and the timing chambers initially maintains the timing chamber in its expanded condition, with the diaphragm which forms one wall thereof balanced in its outwardly displaced position to permit the flush cycle to continue. A carefully contrived force imbalance eventually biases the pilot valve assembly to its closed position. Specifically, the flush fluid pressure within a sensing, or feed back control, chamber acts directly against the outwardly displaced diaphragm, the flush fluid pressure within a pilot chamber acts directly against the stem valve element of the pilot valve assembly and, simultaneously, a spring assists in biasing the stem valve element of the pilot valve assembly in such a direction as to drive the stem portion thereof against the outwardly displaced diaphragm. The aforesaid force imbalance acts against the diaphragm in such a way as to urge it in a direction which causes the timing chamber to contract and thereby force the pneumatic fluid within the timing chamber back into the energizing chamber through a bleeder sub-assembly. By adjusting the bleeder sub-assembly to control the reverse flow of the pneumatic fluid from the timing chamber back into the energizing chamber, one can control the closure of the pilot valve assembly. When the pilot valve assembly closes, the primary valve mechanism will also close, thus terminating the flush cycle. Because the force imbalance imposed on the diaphragm to contract the timing chamber is significantly dependent on water pressure, a substantially constant amount of flush fluid will pass through the flush control valve during each flushing operation, and over a wide range of flush fluid supply pressures.

Except for one side of the diaphragm, which forms one wall of the timing chamber, the entire timing assembly is exposed only to the pneumatic fluid employed thereby. The timing assembly is not, therefore, subject to the corrosion and/or contamination which affects the prior known flush control valves.

One exemplary flush control valve, and a modified component thereof, which collectively embody the concepts of the present invention are shown by way of example in the accompanying drawings and are described in detail without attempting to show all of the various forms and modifications in which the invention might be embodied; the invention being measured by the appended claims and not by the details of the specification.

DESCRIPTION OF AN EXEMPLARY EMBODIMENT

Figures 1, 7, 8, 9:
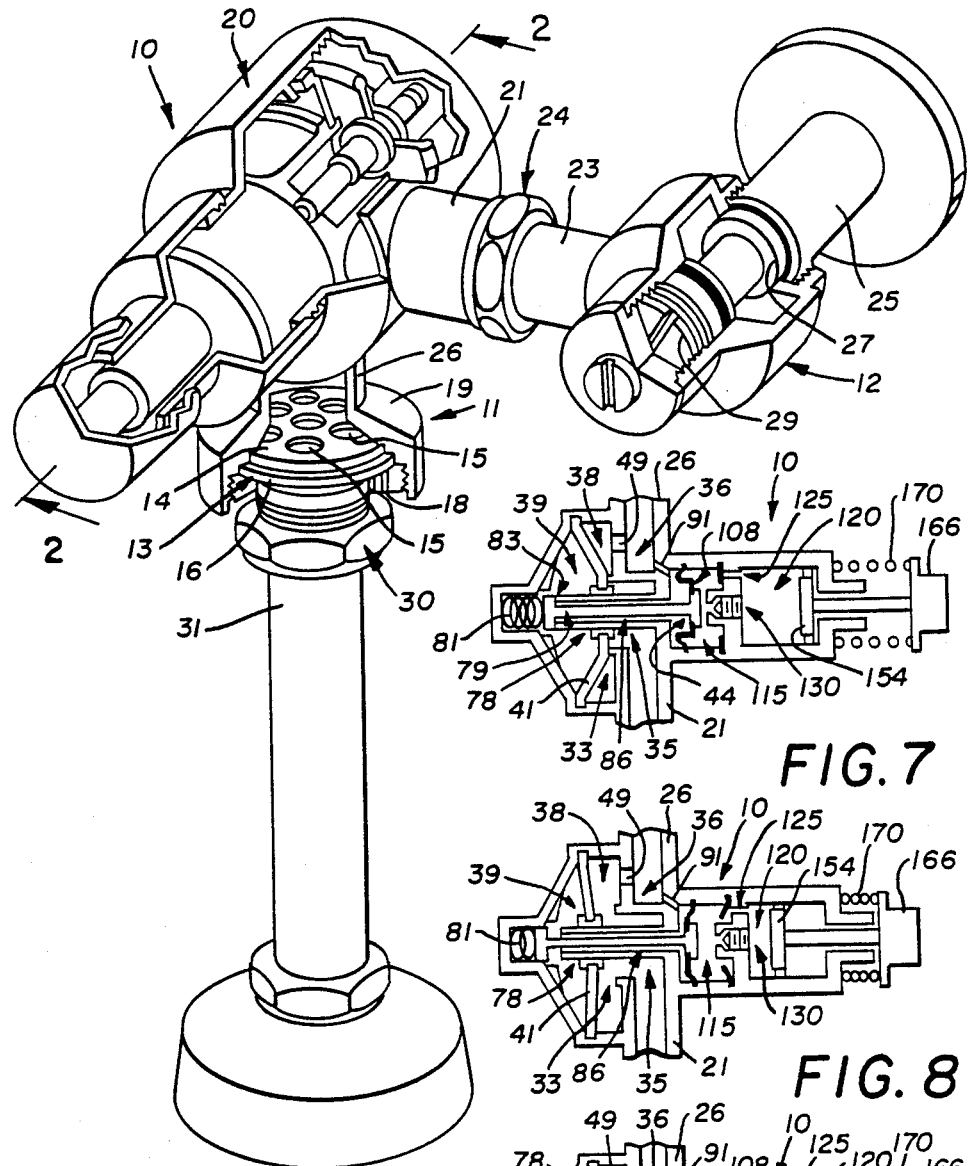
FIG. 1 is a perspective view of a flush valve incorporating the concepts of the present invention and depicted operatively connected to an antisiphon, vacuum breaker assembly and a check valve/flow control assembly.
FIG. 7 is a schematic cross sectional view depicting the flush control valve in a manner similar to FIG. 2 but with less detail and at considerably reduced scale, and appearing on the same sheet of drawings as FIG. 1, said schematic diagrammatically depicting the flush control valve in the closed position.
FIG. 8 is also a schematic cross sectional view similar to FIG. 7, and also appearing on the same sheet of drawings as FIG. 1, which diagrammatically depicts the flush control valve as having been manually actuated and with the diaphragm valve element in the interim position of its movement between the closed position and the open position; and, FIG. 9 is a further schematic view similar to FIGS. 7 and 8, and also appearing on the same sheet of drawings as FIG. 1, which diagrammatically depicts the valve in the open position and with the timing mechanism operating to hold the valve open for a predetermined time after the valve has been manually actuated.

One representative form of a flow control valve embodying the concepts of the present invention, and particularly adapted for use as a urinal flush valve, is designated generally by the numeral 10 on the accompanying drawings. Such valves are commonly designated as Flushometer Valves in the industry.

When operatively installed, the flush control valve 10 is generally associated with both an anti-siphon, vacuum breaker assembly 11 and a check valve/flow control assembly 12 to prevent backflow of potentially contaminated water (water being normally employed as the flush fluid) into the water supply. Vacuum breaker assemblies 11 as well as ckeck valve/flow control assemblies 12 are well known to the art, and suitable embodiments of both assemblies are commercially available.

Typically, a vacuum breaker assembly 11 employs a diaphragm 13 which may be radially slotted to permit the flow of liquid from the flush valve 10 to the urinal, not shown, during the flushing cycle but to prevent the flow of liquid in the opposite direction, at least for the time required to permit the admission of air into the downstream side of the vacuum breaker assembly 11, to preclude reverse flow through the vacuum breaker assembly 11. One way by which to achieve the requisite directionality for the flow is to locate the diaphragm 13 in moderately floating juxtaposition with a diaphragm support 14 having a plurality of openings 15 which allow the slots in the diaphragm 13 to open only when the fluid is flowing in the desired direction, thereby precluding reverse flow at least momentarily. The pressure of the fluid which forces the diaphragm 13 into contiguous engagement with the support 14 during any attempted reverse causes the resilient rim 16 of the diaphragm 13 to move firmly against the support 14 and thereby open at least one aperture 18 which communicates with atmosphere through the secondary housing 19 within which the anti-siphon, vacuum breaker assembly 11 in encased, all as well known to the art.

Typically, a check valve/flow control assembly 12 opens to permit flush fluid, such as water, to flow from a pressurized source, such as a water main, to the flush control valve 10, but closes to prevent the flow of flush fluid in the other direction. The vacuum breaker assembly 11 and the check valve/flow control assembly 12 thus effectively combine to provide a two-fold means by which to preclude backflow which might otherwise occur if the source of the flush fluid were even momentarily depressurized.

Figure 2:
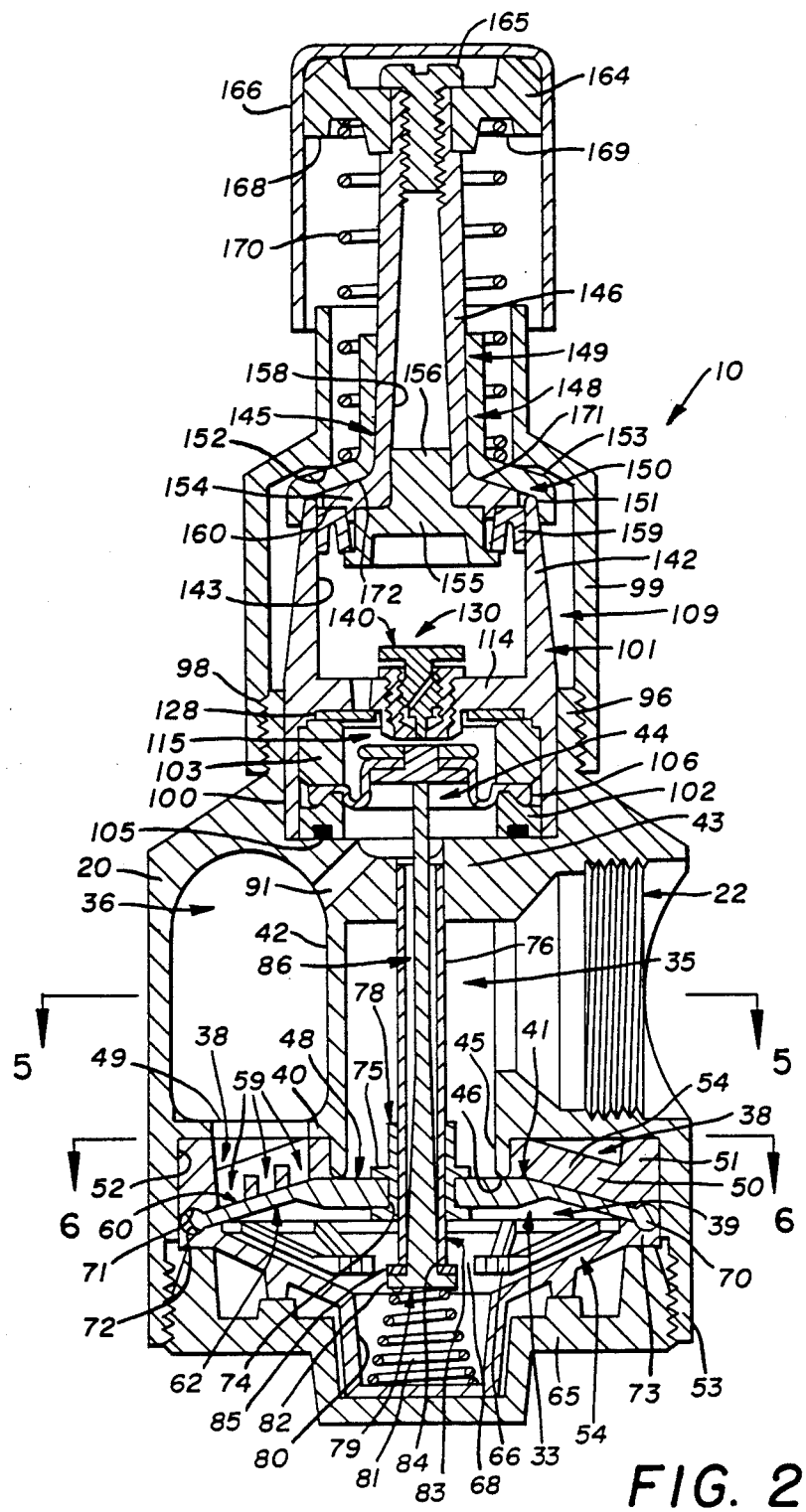
FIG. 2 is an enlarged cross sectional view taken substantially along line 2—2 of FIG. 1 and depicting the flush control valve in the closed position.
Figure 3:
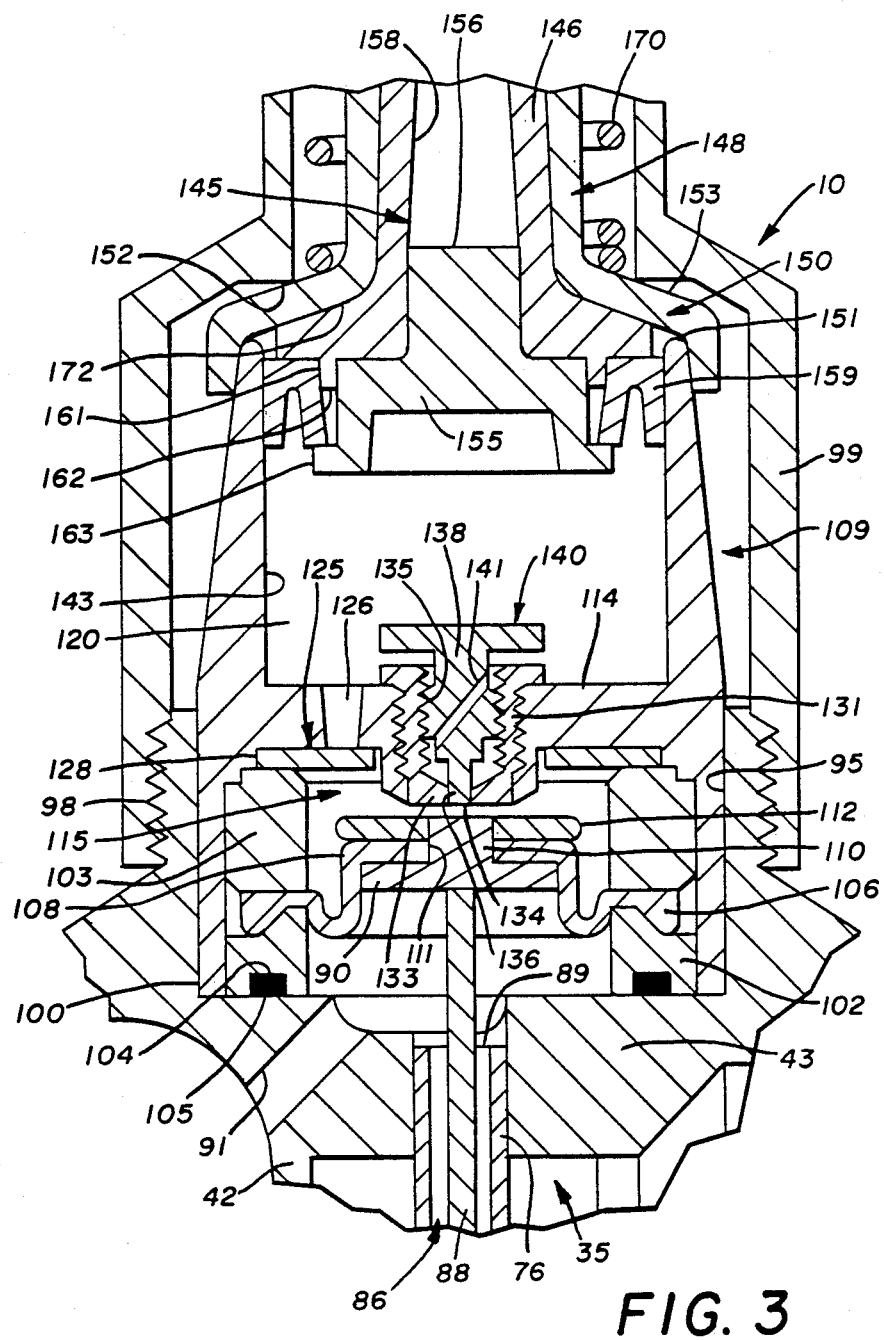
FIG. 3 is a further enlarged area of FIG. 2 which particularly focuses on the details of the timing assembly.
Figure 5:
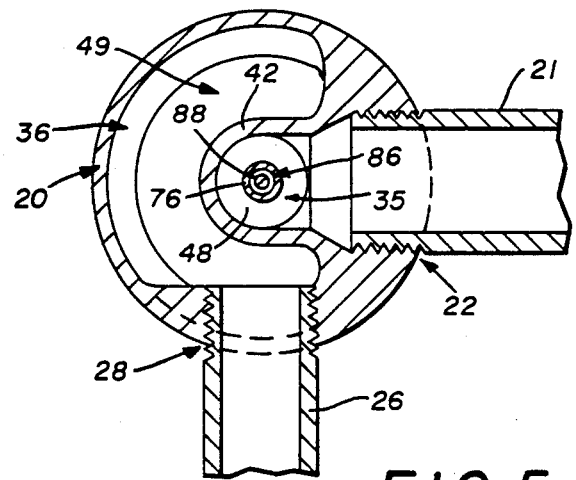
FIG. 5 is a cross sectional view, of reduced scale, taken substantially along line 5—5 of FIG. 2 and particularly depicting the relationship of the inlet and outlet chambers within the housing of the flush control valve depicted in FIG. 2.
Figure 6:
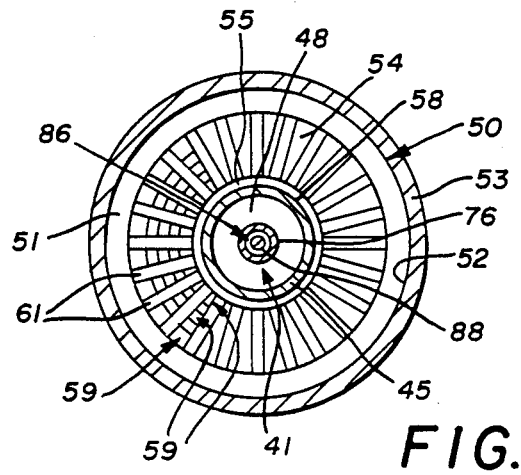
FIG. 6 is also a cross sectional view, of reduced scale, taken substantially along line 6—6 of FIG. 2 and depicting the configuration of that diaphragm supporting disk which is disposed on the opposite side of the diaphragm valve element from the end cap.

As clearly represented in FIGS. 1 and 2, the flush valve 10 employs a chambered main housing 20. FIG. 5, however, best depicts the conduit 21 which is threaded into, and extends outwardly from, the inlet port 22 of the housing 20. The hollow interior of the conduit 21 communicates, via piping 23 (FIG. 1), with the check valve/flow control assembly 12. The conduit 21 is preferably connected to the piping 23 by a sliding union 24 which facilitates lateral location and adjustment between the flush valve 10 and the check valve/flow control assembly 12 necessary to accommodate any inaccuracies introduced, for example, during the rough-in plumbing, thereby assuring an aligned installation between the flush control valve 10 and the check valve/flow control assembly 12.

The check valve/flow control assembly 12 may be threadably connected to a water supply conduit 25, and, as is also well known to the art, the check valve/flow control assembly 12 may employ a spring biased check valve element 27 which opens only in response to the line pressure applied thereagainst from the water supply conduit 25 when that line pressure exceeds the pressure of the fluid within the piping 23. This arrangement is utilized not only to provide back-flow protection but also to regulate the flow rate from the water supply conduit 25 to the flush valve 10. The typical check valve/flow control assembly 12 is also normally provided with means, such as the threaded plug 29, by which selectively to close and secure the check valve element 27 in order to shut off the supply of fluid to the flush control valve 10, as may be desired or required, to permit the flush control valve 10 to be routinely serviced, maintained or even replaced without requiring the plumber to find a remotely located service valve to the water supply conduit 25.

With particular reference again to FIG. 5, a second conduit 26 is threaded into, and extends outwardly from, the outlet port 28 of the housing 20. The hollow interior of the second conduit 26 communicates with the vacuum breaker assembly 11 (FIG. 1). For convenience the second conduit 26 may terminate in the secondary housing 19 which encases the vacuum breaker assembly 11. A union coupling 30 may be employed to secure the vacuum breaker assembly 11 to the feed pipe 31 which delivers the flush fluid from the vacuum breaker assembly 11 to the urinal, not shown. Such a construction facilitates removal of the flush control valve 10, if desired or required, for service, maintenance or replacement.

As best depicted in FIG. 2, the chambered interior of the flush valve housing 20 includes: a primary valve assembly 33; an inlet chamber 35; an outlet chamber 36; a transitional chamber 38; and, a pilot chamber 39. With continued reference to FIG. 2, it can be seen that the inlet and outlet chambers 35 and 36, respectively, are both separated from the transitional chamber 38 by an intermediate wall 40 which extends transversely across the housing 20. The transitional chamber 38 is, in turn, separated from the pilot chamber 39 by the diaphragm valve element 41 of the primary valve assembly 33 which will be hereinafter more fully described.

With reference to FIG. 5 in addition to FIG. 2, it can be seen that the inlet chamber 35 is separated from the outlet chamber 36 by an semi-cylindrical partition wall 42 which extends perpendicularly between the intermediate wall 40 and the end wall 43 (FIG. 2). The end wall 43 also extends transversely of the housing 20, but in spaced, substantially parallel, relation relative to the intermediate wall 40. A sensing, or feed back control, chamber 44 is separated from the inlet and outlet chambers 35 and 36 by the transverse end wall 43.

The inlet chamber 35 communicates with the inlet port 22, and thus the hollow interior of the conduit 21. The inlet chamber 35 is also exposed to a control surface on the diaphragm valve element 41. Specifically, an annular extension wall 45 extends perpendicularly outwardly from the intermediate wall 40 in a direction opposite to that of the semi-cylindrical partition wall 42 to present an annular valve seat 46 against which a first side of the diaphragm valve element 41 selectively abuts to close the inlet chamber 35 from the outlet chamber 36. The diaphragm valve element 41 and the annular seat 46 combine to form the primary valve assembly 33.

That portion of the diaphragm valve element 41 circumscribed by the valve seat 46 when it is engaged by the first side of the diaphragm valve element 41 comprises the inlet flush fluid reaction surface 48 of the diaphragm valve element 41, and the reaction surface 48 remains exposed to the inlet chamber 35, and thus the pressure of the fluid therein, at all times.

The outlet chamber 36 communicates with the outlet port 28, and thus the hollow interior of the conduit 26. The outlet chamber 36 also communicates with the transitional chamber 38 through an access port 49 which penetrates the intermediate wall 40. The transitional chamber 38 is located between the intermediate wall 40 and an annular diaphragm supporting disk 50, the details of which become most readily apparent by reference to FIGS. 2 and 5.

An annular rim 51 defines the radially outermost extent of the diaphragm supporting disk 50, and the rim 51 engages the cylindrical interior surface 52 of the skirt 53 which extends perpendicularly outwardly from the intermediate wall 40. The supporting disk 50 also presents a relatively flat pitch, conically tapered, web wall 54 which extends radially inwardly from the rim 51 to a circular ring wall 55 that defines the radially innermost extent of the supporting disk 50 and which engages the radially outer surface 58 of the extension wall 45. The web wall 54 engages and supports the diaphragm valve element 41 when the latter is disposed in the position represented in FIG. 2, which is the position assumed thereby when the flush control valve 10 is "closed."

The major portion of the web wall 54 is impenetrable, but a fractional portion thereof is preferably perforated, as at 59, to provide unrestricted communication between the transitional chamber 38 and the passive surface 60 of the diaphragm valve element 41. As depicted, the perforations 59 are concentrated at one location which need only constitute approximately one third of the total area of the web wall 54. The result of this structural configuration is hereinafter explained in conjunction with the explanation as to the operation of the flush control valve 10.

The passive surface 60 comprises that portion of the first side of the diaphragm valve element 41 which is disposed radially outwardly from the reaction surface 48. As is also depicted, the perforations 59 may be disposed in register with a portion of the access port 49. When the flush control valve 10 is closed, and the diaphragm valve element 41 is disposed as depicted in FIG. 2, the outlet chamber 36 is essentially devoid of liquid so that the passive surface 60 of the diaphragm valve element 41 is exposed only to atmospheric pressure.

The structural integrity of the web wall 54 may be enhanced by providing a plurality of circumferentially spaced reinforcing ribs 61 which extend radially outwardly from the ring flange 55 to the rim 51. The perforations 59 through the web wall 54 are located between successive reinforcing ribs 61.

The entire second side of the diaphragm valve element 41 defines a pilot surface 62. The pilot surface 62 of the diaphragm valve element 41 is fully exposed to the pilot chamber 39. The area of the pilot surface 62 is, therefore, substantially equal to the combined areas of the inlet flush fluid reaction surface 48 and the passive surface 60, which together comprise the first side of the diaphragm valve element 41. In addition to the pilot surface 62 the pilot chamber 39 is bounded by the interior wall 63 of a diaphragm supporting cap 64. The supporting cap 64 is held in place by an end cap 65.

The diaphragm supporting cap 64 has a plurality of circumferentially spaced supporting feet 66 which engage the second side - i.e., the pilot surface 62 - of the diaphragm valve element 41 when the latter is disposed in the position depicted in FIG. 9, which is the position assumed when the flush control valve 10 is "open." The supporting feet 66 prevent the diaphragm valve element 41 from being forced into sealing engagement with the conical surface 68 of the supporting cap 64 when the flush control valve 10 is open.

Figure 4:
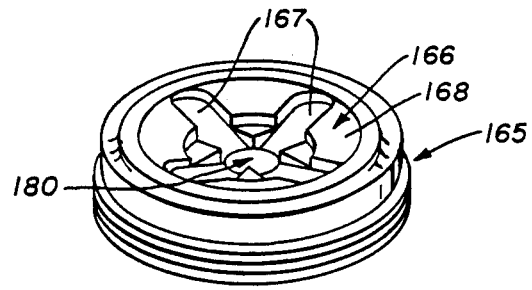
FIG. 4 is a perspective view of an alternative form of end cap that may be employed in conjunction with a flush control valve incorporating the concepts of the present invention.

As an alternative, the diaphragm supporting cap 64 and the end cap 65 may be combined into a single structural component - i.e., the modified end cap 165 depicted in FIG. 4. In that alternative arrangement the supporting feet 166 may be formed directly in the end cap 165. The radial recesses 167 provided between the supporting feet 166 in the alternative end cap 165 allow continuous access to the pilot surface 62 of the diaphragm valve element 41 from pilot chamber 39 even when the diaphragm valve element 41 is disposed in contiguous engagement with the conical surface 168 presented from the supporting feet 166.

In either event, the end cap 65, or the modified end cap 165, may be threadably secured to the interior of the skirt 53. When the end cap 65 is secured within the skirt 53 it secures the sealing bead 70 on the radially outer edge of the diaphragm valve element 41 between a receiving recess 71 formed in the rim 51 of the diaphragm supporting disk 50 and an opposed receiving recess 72 formed in the peripheral rim 73 of the diaphragm supporting cap 64. So secured by the end cap 65, the bead 70 effects a fluid tight seal between the skirt 53 and both the diaphragm supporting disk 50 and the diaphragm supporting cap 64, thus sealing the pilot chamber 39 from the transitional chamber 38 and the chambers that are capable of communicating therewith.

In the closed position of the primary valve assembly 33 depicted in FIG. 2, the pilot chamber 39 is filled with flush fluid at substantially the same pressure as the flush fluid in the inlet chamber 35. As such, there is a pressure imbalance acting upon the diaphragm valve element 41 to maintain it in the position depicted in FIG. 2. Specifically, the entire pilot surface 62 on the second side of the diaphragm valve element 41 is exposed to the pressure of the flush fluid within the inlet chamber 35 and yet only the opposed reaction surface 48 on the first side of the diaphragm valve element 41 is exposed to the pressure of the flush fluid within the inlet chamber 35. Because the passive surface 60 on the first side of the diaphragm valve element 41 is exposed only to atmospheric pressure, the diaphragm valve element 41 is subjected to a pressure imbalance that maintains the diaphragm valve element 41 in the closed position.

In order to explain how the pilot chamber 39 is exposed to the pressure of the flush fluid within the inlet chamber 35 one must refer to FIG. 2 wherein it can be seen that the diaphragm valve element 41 is pierced by a central aperture 74 through which a hub member 75 is carried. The hub member 75 slidingly, but not sealingly, engages the exterior of a guide tube 76. The clearance between the hub member 75 and the exterior of the guide tube 76 forms a restricted passage 78 by which the flush fluid within the inlet chamber 35 passes into the pilot chamber 39. Hence, the pressure of the flush fluid within the pilot chamber 39 will, after the modest delay occasioned by the restricted cross sectional area of passage 78, be equal to the pressure of the flush fluid within the inlet chamber 35.

The interior of the guide tube 76 cooperates with the stem valve element 79 of the pilot valve assembly 83. Specifically, the stem portion 88 of the stem valve element 79 is slidably received within the guide tube 76. The diaphragm supporting cap 64 has a pocket, or spring seat, 80 which receives a pilot spring 81. The pilot spring 81 assists in biasing the head 82 of the stem valve element 79 against a seat 84 presented from the adjacent end of the guide tube 76. A sealing washer 85 is interposed between the head 82 and the seat 84 on the guide tube 76 selectively to seal the pilot chamber 39 from the passage 86 formed between the stem portion 88 of the stem valve element 79 and the interior of the guide tube 76.

It will be noted that the stem portion 88, in proximity to the head 82, is conically tapered so that the maximum diameter of the stem portion 88 closely engages the interior of guide tube 76 when the head 82 engages the seat 84. The conical taper of the stem portion 88 serves at least one primary and one secondary purpose. Primarily, the taper effects a progressive expansion of the passage 86 as the pilot valve assembly 83 opens, and conversely, the taper effects a progressive constriction of the passage as the pilot valve assembly 83 closes. The progressive constriction is particularly important in that it forces the pressure in the pilot chamber 39 to build relatively slowly, thereby contributing to the prevention of water hammer during that phase of the operation of the flush control valve 10. The conical taper of the stem portion 88 also tends to center the stem portion 88 relative to the interior of the guide tube 76 as the pilot valve assembly 83 closes. As should now be apparent, the stem valve element 79 and the seat 84 cooperate to comprise the pilot valve assembly 83.

As shown, the pilot spring 81 may be a volute spring. To effect the desired bias to the stem valve element 79, the pilot spring 81 may be compressed between the spring seat 80 within the supporting cap 64 and the head 82 of a stem valve element 79. It should be explained that the pilot spring 81 is not an essential element to the operation of the flush control valve 10. Naturally, the effect of the pilot spring is taken into consideration during the design and fabrication of a flush control valve 10 embodying the concepts of the present invention so that the presence of the pilot spring 81 will not interfere with the operation of the flush control valve 10, but the valve 10 can operate satisfactorily without the pilot spring 81. The pilot spring is incorporated in the valve 10 for three special purposes - viz., it serves to maintain the stem valve element 83 seated in one position against the seat 84 when the valve 10 is being shipped; it precludes the possibility that components of the flush control valve will be disposed to permit the valve 10 to effect an immediate, partial flush when it is first installed in a system; and, it may be required to assist in closing the pilot valve when the pressure in the water supply conduit 25 is excessively low.

A similar pocket, or spring seat, 180, may also be provided in the alternative end cap 165, as depicted in FIG. 4, for being similarly engaged by the pilot spring 81.

With continued reference to FIG. 2, the upper end 89 of the guide tube 76 is anchored within the transverse end wall 43 of the housing 20. The stem portion 88 of the stem valve element 79 extends axially beyond the transverse end wall 43, through the sensing chamber 44 and into abutment with a wear plate 90. The sensing, or feed back control, chamber 44 is in fluid communication not only with the passage 86 formed between the stem portion 88 of the stem valve element 79 and the interior of the guide tube 76 but also with the outlet chamber 36 through a passage 91 which penetrates the transverse end wall 43. Thus, in the closed position of the primary valve assembly 33, the sensing chamber 44 and the passages 86 and 91 are also at atmospheric pressure.

The sensing, or feed back control, chamber 44 may be conveniently constructed within a cylindrical recess 95 in the housing 20. The recess 95 is surrounded by a neck 96 which extends upwardly from the transverse end wall 43. The outer circumference of the neck 96 is preferably threaded, as at 98, to provide a means by which a retaining collet 99 can be demountably secured to the neck 96. The skirt 100 of a timer housing 101 is fitted within the cylindrical recess 95, and a pair of annular ring members 102 and 103, in turn, are closely fitted within the interior of the skirt 100.

The ring member 102 is provided with an axially directed, annular recess 104 within which an O-ring 105 is seated, and the compression of the O-ring 105 against the end wall 43, as by tightening the retaining collet 99 in the manner hereinafter more fully described, seals the sensing chamber 44, which is located interiorly of the ring 102, relative to atmosphere along the surfaces of the recess 95 as well as relative to the hereinafter described timing chamber 115 within the skirt 100. A bead 106 is presented from the radially outer periphery of a diaphragm 108, and the bead 106 is captured between the two rings 102 and 103 to effect a seal between the rings 102 and 103 and thereby preclude communication between the control, or feed back, chamber and the timing chamber 115 from occurring along the periphery of the diaphragm 108. The diaphragm 108, the ring 102 and the transverse wall 43 combine to define the sensing, or feed back control, chamber 44. One type of diaphragm 108 which functions quite well is the rolling diaphragm depicted in the drawings.

Those components directly and operatively associated with, and those contained within, the timer housing 101 on that side of the diaphragm 108 opposite to the sensing chamber 44 cooperatively interact as a timing assembly 109.

With continued reference to FIG. 2, the wear plate 90 has an axial stub 110 which extends perpendicularly from the wear plate 90 to pierce the center of the diaphragm 108 and extend through the central aperture 111 of the backing plate 112. The two plates 90 and 112 firmly sandwich the central portion of the diaphragm 108 therebetween, and the stub 110 is upset, or otherwise secured, to the backing plate 112 in order to effect a joinder which will preclude fluid communication through the diaphragm 108.

On the side of the diaphragm 108 opposite the sensing chamber 44 is the timing chamber 115. The timing chamber 44 is delineated by the second ring 103, a medial wall 114 which extends transversely across the timer housing 101 and the diaphragm 108. On the opposite side of the medial wall 114 is an energizing chamber 120 which will hereinafter more fully described. A check valve assembly 125 is provided by virtue of an aperture 126 which extends through the medial wall 114 and a resilient flap valve element 128 which is captured between the ring member 103 and the medial wall 114 to permit pneumatic fluid to flow from the energizing chamber 120 into the timing chamber 115 but not in the opposite direction.

A bleeder sub-assembly 130 operates between the energizing chamber 120 and the timing chamber 115 to permit pneumatic fluid to flow from the timing chamber 115 into the energizing chamber 120 at a controlled rate. The bleeder sub-assembly 130 may employ a cup-like body 131 that is securely threaded into a bore 132 which penetrates the medial wall 114. The cup-like body 131 has a base wall 133 which is provided with a needle port 134. The interior of the body 131 is also preferably threaded, as at 135, cooperatively to receive the threaded shank 138 from which the needle valve element 136 is presented. The body 131 thereby serves as a support for the needle valve element 136.

The needle valve element 136 extends axially from one end of the shank 138, and a head 140 may be presented from the opposite end of the shank 138. Selectively rotating the shank 138 within the cup-like body 131 will determine the extent to which the needle valve element 136 restricts the needle port 134 and thereby control the rate at which the pneumatic fluid within the timing chamber 115 can return to the energizing chamber 120. It should be noted that the fluid which passes through the needle port 134 can return to the energizing chamber 120 by virtue of a duct 141 which extends diagonally through the shank 138. As an alternative to the duct 141 one could well incise a recess which would extend longitudinal along the threads of the shank 138 to bypass the threaded engagement of the shank 138 with the cup-like body 131 and thereby provide the requisite free passage of fluid from the needle port 134 into the energizing chamber 120.

The energizing chamber 120 is circumscribed by an annular wall 142 of the timing housing 101 which extends upwardly of the medial wall 114. The interior surface 143 of the annular wall 142 defines a cylinder within which an actuating piston assembly 145 is slidably received.

The actuating piston assembly 145 employs an actuating shaft 146 that is cooperatively engaged by a guide sleeve 148. Specifically, the guide sleeve 148 has a hollow cylindrical portion 149 within which the actuating shaft 146 is slidably received. The cylindrical portion 149 of the guide sleeve 148 flares radially outwardly into a bell cap 150 which overlies the uppermost rim 151 of the timer housing 101. The retaining collet 99 incorporates an interior shoulder 152 which engages the axially upwardly directed surface 153 on the bell cap 150, as viewed in FIG. 2, so that as the retaining collet 99 is tightened onto the neck 96 of the main housing 20, the shoulder 152 drives the guide sleeve 148 against the timer housing 101 in order to secure the timer housing 101, and the actuating shaft 146 received therein, to the main housing 20.

One end of the actuating shaft 146 flares into a piston head 154, and a retaining plug 155 is attached to the piston head 154. As depicted, the retaining plug 155 may present a stem 156 which is frictionally press fit within the hollow interior 158 of the actuating shaft 146. A seal 159 is positioned against a shelf 160 and the radially outwardly directed surface 161 of an annular locating rib 162 on the underside of the piston head 154 and is maintained in that position by engagement with a flange 163 which extends radially outwardly from the retaining plug 155.

A push button mounting block 164 is attached to the other end of the actuating shaft 146, as by a screw 165. A push button cap 166 may be frictionally press fit over the mounting block 164. The under surface 168 of the mounting block 164, which extends radially outwardly from the actuating shaft 146, is preferably provided with an axially directed, annular recess 169 within which one end of a compression spring 170 may be received. The other end of the compression spring 170 coacts against the surface 153 of the bell cap 150 biasingly to urge the actuating piston assembly 145 in a direction which increases the volume of the energizing chamber 120 - i.e., axially upwardly as viewed in FIG. 2. The axially uppermost position of the actuating piston assembly 145 may be defined by engagement of the upwardly directed surface 171 on the flared piston head 154 with the opposed surface 172 on the underside of the flared bell cap 150.

When designing the mechanism which actuates the timing assembly 109, one should attempt to provide a structural arrangement such that a minimum application of pressure is required to be applied against the push button cap 166. In that way even a relatively young, or weak, person will be able to actuate the flush control valve 10. The structural arrangement should also require only a relatively short stroke of the piston head 154 to accomplish its functional objective. This, too, facilitates usage by a young, or weak, person and at the other end of the spectrum tends to obviate abuse by strong individuals who might, either inadvertently or intentionally, apply a lateral force to the push button cap 166. The longer the stroke required of the piston head 154, the longer the actuating shaft 146 that would be required to translate the piston head 154. The longer the actuating shaft 146, the more readily it would be subject to bending, or even to breaking.

Operation

When the push button cap 166 is manually depressed against the biasing action of compression spring 170, the actuating piston assembly 145 is moved in a direction which causes the piston head 154 to reduce the volume of the energizing chamber 120. This creates an increase in the pressure of the pneumatic fluid within the energizing chamber 120, and a portion of the pressurized pneumatic fluid within the energizing chamber 120 is forcefully transferred through the check valve assembly 125 into the timing chamber 115.

When the pressure in the timing chamber 115 is sufficient to overcome the combined forces of the flush fluid pressure in pilot chamber 39 as well as the force of the spring 81, both of which act against the head 82 of the stem valve element 79 in the pilot valve assembly 83, the diaphragm 108, which comprises one wall of the timing chamber 115, will begin to move in a direction which expands the timing chamber 115. This causes the stem portion 88 of the stem valve element 79 to translate axially within the guide tube 76 and the annular seal 85 to be removed from the seat 84 at the end of the guide tube 76 so that the flush fluid within the pilot chamber 39 can flow through the passage 86 to the sensing chamber 44 and then through the passage 91 into the outlet chamber 36. This flow reduces the pressure of the fluid in the pilot chamber 39, and while it does modestly increase the pressure within the sensing chamber, that pressure increase is not sufficient to prevent expansion of the timing chamber 115. As a result of the pressure reduction in the pilot chamber 39, the pressure in the inlet chamber 35 acting on the reaction portion 48 of the diaphragm valve element 41 will cause the diaphragm valve element 41 to be displaced from the seat 46 to permit pressurized flush fluid to enter between the diaphragm valve element 41 and the web wall 54 of the diaphragm supporting disk 50. The pressure of the flush fluid is thereby almost instantaneously applied to the entire passive surface 60 as well as the reaction surface 48 on one side of the diaphragm valve element 41 and at the same time the flush fluid within pilot chamber 39 can be evacuated through the passage 86 in the pilot valve assembly 83. Because the cross sectional area of the passage 86 is significantly larger that the cross sectional area of passage 78, the net effect is that the pilot chamber 39 will quickly empty against the force of the pressure applied to the combined reaction surface 48 and the passive surface 60. Because the passage 91 preferably has substantially the same cross sectional area as the passage 86, there will initially be only a very modest increase of the pressure within sensing chamber 44, particularly inasmuch as the fluid in the sensing chamber can be quickly evacuated into the outlet chamber 36.

The overall result is that a substantially unrestricted flow of flush fluid from the inlet chamber 35 to the outlet chamber 36. The fluid in the outlet chamber 36 is, of course, directed through the outlet port 28 to the anti-siphon vacuum breaker assembly 11 and then to the urinal to produce a flushing action.

When the push button cap 166 is released, the spring 170 will return the piston head 154 to the position shown in FIG. 2. This movement of the piston head assembly 154 will cause a reduction in the pneumatic pressure within the energizing chamber 120. With the reduction of the pressure in the energizing chamber 120, the application of the pressure in the sensing chamber 44, as well as the biasing action of the spring 81 and the application of whatever fluid pressure exists in pilot chamber 39, both acting against the head 82 of the stem valve element 79, will begin to reverse the movement of the diaphragm 108, thereby contracting the timing chamber 115 and forcing the pneumatic fluid from the timing chamber 115 back to the energizing chamber 120 through the bleeder sub-assembly 130. This flow of the pneumatic fluid within the timing assembly 109 will allow the stem valve element 79 to return to the closed position with the annular seal 85 abutting the seat 84 on the end of the guide tube 76. The time required to close the pilot valve assembly 83 is determined by the degree to which the needle valve element 136 restricts the needle port 134, the biasing force of spring 81, and the pressure of the flush fluid within the sensing, or feed back control, chamber 44. The pressure of the flush fluid not only contributes to the time required to close the pilot valve assembly 83 but is also a controlling factor in determining the amount of flush fluid liquid that is dispensed by the flush control valve 10. It should be appreciated that this use of flush fluid pressure is the key to dispensing a constant volume of flush fluid by the flush control valve 10 over a relatively wide range of liquid supply pressures. When high pressure is reflected in the sensing chamber 44, the valve 10 will automatically adjust for the high flow volume and shorten the flush cycle time. Conversely, when low pressure is reflected in sensing chamber 44, the valve 10 automatically adjusts for the low flow volume and allows a longer flush cycle time.

As the diaphragm valve element 41 closes against the seat 46, the fluid in the inlet chamber 35 continues to flow through the passage 78 along the exterior of the guide tube 76 and into the pilot chamber 39, causing the fluid pressure within the pilot chamber 39 to increase. This increase in fluid pressure within the pilot chamber 39 forces the diaphragm valve element 41 into sealing engagement with the seat 46. When the diaphragm valve element 41 is fully seated, the fluid in the outlet chamber 36 will flow to the urinal until the pressure within the outlet chamber 36 is reduced to substantially atmospheric pressure.

It should be appreciated, however, that as soon as the diaphragm valve element 41 makes contact with the seat 46, the pressure in the outlet chamber 36 drops significantly. Because the perforations are concentrated in a localized area of the web wall 54 rather than being disposed fully across the surface thereof, the reduction of the pressure within the outlet chamber forces that portion of the diaphragm valve element 41 aligned with the localized area within which the perforations 59 are concentrated to engage that portion of the web wall prior to the time that all of the flush fluid is fully evacuated from between the diaphragm valve element 41 and the web wall 54. This trapped flush fluid tends to create an interim accumulator so that as the kinetic energy of the flush fluid flowing into the inlet chamber 35 causes the flush fluid to impact against the reaction surface 48 of the diaphragm valve element 41, allowing the diaphragm valve element 41 to tend to flutter against the build up of pressure within the pilot chamber 39 until the fluid between the diaphragm valve element 41 and the web wall 54 has been fully evacuated, and the pressure of the fluid within the pilot chamber 39 equals that of the flush fluid within the inlet chamber 35. As such, water hammer is precluded.

From the foregoing description, it should be understood that the flush fluid passing through the flush control valve 10 never comes in contact with the mechanism of the timing assembly 109. The pilot valve assembly 83 is in contact with the liquid; however, the tolerance between the components of the pilot valve assembly 83 which define the passage 86 - viz., the stem portion 88 and the guide tube 76 within which the stem portion 88 reciprocates - can be fabricated so that the passage 86 is relatively large compared to any contaminant that could reasonably be expected to be present in the system. As such, any corrosion or contamination in this area will not adversely affect the operation of the flush control valve 10. This result is particularly assured because of the vigorous flow of the flush fluid through the passage 86. Accordingly, a self cleaning action results such that any contaminates will likely be flushed through the flush control valve 10.

Timing control is effected by the self contained timing assembly 109, the components of which never come in contact with the flush fluid. The operation of the timing assembly 109, as should be appreciated from the foregoing description, is relatively uncomplicated. The piston head 154 reduces the size of the energizing chamber 120 and forces the air into the smaller timing chamber 115 as represented in the progressive schematics of FIGS. 7 and 8. The diaphragm 108 expands in response to expansion of the timing chamber 115 to drive the wear plate 90 against the stem 88, which reduces the pressure of the flush fluid within the pilot chamber 39 and allows the diaphragm valve element 41 to "open" and permit flush fluid to flow through the flush control valve 10, initiating the flushing action. The flushing will end when the timing and energizing chambers 115 and 120, respectively, return to the configuration depicted in FIG. 7.

To focus primarily on the schematic diagrams comprising FIGS. 7, 8 and 9, FIG. 7 depicts the valve 10 in the closed position. From this position, the operator displaces the piston head 154 to the position shown in FIG. 8. As the piston head 154 is moved toward the position of FIG. 8, the pressure in the energizing chamber 120 will increase due to the decrease in the volume of that chamber. As previously described in considerable detail, the pressure increase causes the diaphragm valve element 41 to open, as shown progressively in FIGS. 8 and 9, permitting substantially unrestricted flow of the flush fluid from the inlet chamber 35 to the outlet chamber 36.

As the pressure in the timing chamber 115 increases, the diaphragm 108 displaces the stem valve element 79 fully against the spring 81. Because the timing chamber 115 is smaller than the energizing chamber 120, the pressure in timing chamber 115 will be raised significantly when the piston head 154 reduces the volume of the energizing chamber 120 to the full extent possible. If the movement of the pneumatic fluid takes place under substantially isothermal conditions, the pressure will change inversely with a change in volume. For example, if the volume of the energizing chamber 120 is six times the volume of the timing chamber 115, the pressure in the timing chamber 115 will be six times the original pressure in the energizing chamber 120. Thus, if the original pressure is at atmospheric pressure (14.7 psi, or 1.0 Kg/cm$^2$), the final pressure in the timing chamber 115 will be approximately 88.2 psi (6.2 Kg/cm$^2$). This pressure rise multiplied by the area of the diaphragm 108 determines the force available to open the pilot valve assembly 83 to initiate the flushing action.

When the pilot valve assembly 83 opens, as shown in FIG. 8, the flush fluid in the pilot chamber 39 will flow freely through the passage 86 into the sensing chamber 44, out the passage 91 and into the outlet chamber 36. The flush fluid in the pilot chamber 39 must be replaced through the restricted passage 78. The resulting flow differential allows the pressure of the flush fluid within pilot chamber 39 to decrease, allowing the diaphragm valve element 41 to be moved by the pressure of the flush fluid within the transitional chamber 38 so that fluid communication between the inlet chamber 35 and the outlet chamber 36 will occur quite freely. With the fluid pressure in chambers 35 and 36 being greater than the fluid pressure in pilot chamber 39, the diaphragm valve element 41 will remain open and flush fluid will flow through the flush control valve 10.

The flushing action is completed during a brief period of time after the push button cap 166 is released. The spring 170 returns the piston head 154 to the position showin in FIGS. 2, 7 and 9. The pneumatic fluid in timing chamber 115 will not change rapidly because the check valve assembly 125 does not permit return flow from the timing chamber 115 into the energizing chamber 120. Accordingly, the pneumatic fluid will have to flow through the bleeder subassembly 130. The spring 81, and pressure of the flush fluid within the pilot chamber 39 as well as the pressure of the flush fluid within the sensing chamber 44 will urge the stem valve element 79 and the diaphragm 108 from the position depicted in FIG. 9 to the position depicted in FIG. 7. The time required for the stem valve element 79 to return to the closed position shown in FIGS. 2 and 7 will be primarily determined by the flush fluid pressures in the sensing chamber 44 and the pilot chamber 39 as well as the characteristics of the bleeder subassembly 130. The force applied by spring 81 will also have a modest affect on closing the pilot valve assembly 83.

When the stem valve element 79 returns to the closed position, the fluid pressure in the pilot chamber 39 will increase to a value equal to the pressure of the flush fluid within the inlet chamber 35, which is slightly greater than the pressure of the flush fluid within the outlet chamber 36 even while the primary valve assembly 33 remains open. This results in a pressure imbalance on the diaphragm valve element 41, forcing it to move to the closed position shown in FIGS. 2 and 7. This completes the flush cycle, and the flush control valve 10 is ready for another flush cycle.

The volume of flush fluid to be delivered per flush by the flush control valve 10 is generally pre-set at the factory, and the unique construction of the flush control valve 10 allows the bleeder sub-assembly 130 to be pre-set to effect the desired flow. Typically, the bleeder sub-assembly 130 might be set to deliver a ¾ or a 1½ gallon flow of flush fluid per flush. The ability to pre-set the volume of flow, even over a wide range of flush fluid pressures, is achieved by virtue of the fact that the bleeder sub-assembly 130 directly "senses" the pressure of the flush liquid within sensing chamber 44 and reacts in response thereto to provide the substantially constant liquid use per flush.

To elaborate, one side of the diaphragm 108 is exposed to the sensing chamber 44, and the sensing chamber communicates with the pressure of the flush fluid within the inlet chamber 35 by virtue of passage 86 through the pilot valve assembly 83. The sensing chamber 44 also communicates with the outlet chamber 36 through the passage 91. As such, the sensing chamber 44 provides a feed back to the timing assembly 109 of the flush fluid pressure within the flush control valve 10, and that pressure acts upon the diaphragm 108 - along with the force applied to the diaphragm by stem valve element 79 (which reflects the fluid pressure within the pilot chamber 39 and the force applied by the spring 81)-to force the pneumatic fluid from the timing chamber 115 back through the bleeder sub-assembly 130 and into the energizing chamber 120.

In the configuration depicted, an approximately 1:1 relationship between the cross sectional area of the passage 91 and the cross sectional area of the passage 86 will effect the desired ingress and egress of flush fluid from the sensing chamber 44 to provide the necessary interaction between the flush fluid pressure within the valve 10 and the pneumatic fluid within the timing assembly 130 to determine the volume of flush fluid delivered by the flush control valve 10, and without requiring access of the flush fluid into the timing assembly 130.

As should now be apparent, the present invention not only provides a flush control valve that incorporates a pneumatically operated timing assembly that is maintained out of contact with the flush fluid that passes through the flush control valve but also otherwise accomplishes the objects of the invention.

I claim:

1. A flush control valve comprising:
   a main housing;
   a primary valve assembly incorporated in said main housing to control the flow of flush fluid through said flush control valve;
   an inlet and an outlet chamber provided in said main housing;
   said primary valve means controlling the flow of flush fluid between said inlet chamber and said outlet chamber;
   a pilot valve assembly to effect opening and closing of said primary valve assembly;
   a timing assembly to delay the closing of said pilot valve assembly until after a predetermined volume of flush fluid has passed through said primary valve assembly;
   an energizing chamber and a timing chamber included within said timing assembly;
   pneumatic fluid within said energizing and timing chambers;
   means to compress the pneumatic fluid within said energizing chamber;
   a check valve assembly to permit virtually unrestricted flow of compressed pneumatic fluid from said energizing chamber into said timing chamber;
   a bleeder sub-assembly to control the return flow of said pneumatic fluid from said timing chamber to said energizing chamber;
   expanding means directly associated with said timing chamber not only sequentially to control, and be controlled by, the action of said pilot valve assembly but also to preclude the flush fluid from gaing admission to said timing assembly, said pilot valve assembly being in direct engagement with said expanding means;
   a sensing chamber;

said expanding means separating said timing chamber from said sensing chamber;

a passage through said pilot valve assembly;

said passage effecting communication between said sensing chamber and said inlet chamber when said pilot valve assembly is open; and, a separate passage communicating continuously between said sensing chamber and said outlet chamber whereby the range of fluid pressure in the outlet chamber will be reflected in the sensing chamber automatically to adjust the length of the flush cycle time.

2. A flush control valve, as set forth in claim 1, wherein said expanding means comprises:

a rolling diaphragm.

3. A flush control valve, as set forth in claim 1, wherein said pilot valve assembly further comprises:

a guide tube;

a valve seat presented from said guide tube;

a stem valve element;

a stem portion presented from said stem valve element;

a head extending transversely outwardly from said stem portion selectively to engage said valve seat on said guide tube;

said stem portion being axially slidable within said guide tube to form a passage therebetween;

said stem portion being conically tapered in proximity to said head with the greatest diameter of said conical taper located adjacent said head to effect progressive constriction of said passage through said pilot valve assembly when said pilot valve assembly closes.

4. A flush control valve, as set forth in claim 1, further comprising:

a diaphragm valve element supported within said main housing;

a valve seat in said main housing cooperating with said diaphragm valve element to circumscribe a reaction surface on said diaphragm valve element and itself being circumscribed by a passive surface on said diaphragm valve element;

said diaphragm valve element and said valve seat comprising said primary valve assembly;

a diaphragm support disk supported within said main housing;

said diaphragm support disk presenting a web wall which is selectively engaged by said passive surface on said diaphragm vale element;

the major portion of said web wall being impenetrable;

passage means to permit fluid penetration of said web wall;

said passage means being concentrated within one general area of said web wall.

5. A flush control valve, as set forth in claim 4, wherein;

said passage means are concentrated within an area of said web wall which comprises approximately one third of the total area of said web wall.

6. A flush control valve comprising:

a main housing;

a flush fluid inlet chamber and flush fluid outlet chamber provided in said main housing;

a diaphragm valve element supported within said main housing;

a valve seat in said main housing cooperating with said diaphragm valve element to provide a primary valve assembly whereby selectively to control communication between said inlet and outlet chambers;

cap means cooperating with said main housing for securing said diaphragm valve element therein and cooperating with said diaphragm valve element to form pilot chamber;

guide means secured within said main housing and cooperating with said diaphragm valve element to form a restricted passage between said inlet chamber and said pilot chamber;

a pilot stem valve element slidably disposed within said guide means to form a second passage and selectively to control the flow of flush fluid from said pilot chamber to said outlet chamber through said second passage;

a pneumatic timing assembly having an energizing chamber;

piston means for reducing the volume of said energizing chamber means and ejecting pneumatic fluid therefrom;

a timing chamber in said timing assembly for accepting the pneumatic fluid from said energizing chamber and being expandable in response to the pneumatic fluid introduced from said energizing chamber;

a diaphragm forming one wall of said timing chamber and being disposed in contact with said stem valve element to open and close said second passage, thereby reducing the pressure of the flush fluid within said pilot chamber and permitting the pressure of the flush fluid within said inlet chamber to open said primary valve assembly and effect flush fluid communication from said inlet chamber to said outlet chamber;

a check valve assembly for permitting substantially unrestricted flow of pneumatic fluid from said energizing chamber to said timing chamber and for preventing reverse flow;

a bleeder sub-assembly disposed between said energizing and timing chambers for controlling the reverse flow of pneumatic fluid from said timing chamber to said energizing chamber thereby to control the time during which said primary valve assembly remains open;

a sensing chamber;

said expanding means separating said timing chamber from said sensing chamber;

a passage through said pilot valve assembly;

said passage effecting communication between said sensing chamber and said inlet chamber when said pilot valve assembly is open; and, a separate passage communicating continuously between said sensing chamber and said outlet chamber whereby the range of fluid pressure in the outlet chamber will be reflected in the sensing chamber automatically to adjust the length of the flush cycle time.

7. A flush control valve comprising:

a primary valve assembly for controlling the flow of flush fluid through said flush control valve;

a pilot valve assembly to effect opening and closing of said primary valve assembly;

a timing assembly to delay the closing of said pilot valve assembly until after a predetermined volume of flush fluid has passed through said primary valve assembly;

expanding means directly associated with said timing assembly sequentially to control, and be controlled by, the action of said pilot valve assembly, said pilot valve assembly being in direct engagement with said expanding means;

a sensing chamber;

said expanding means separating said timing assembly from said sensing chamber;

a passage through said pilot valve assembly;

said passage effecting communication between said sensing chamber and said inlet chamber when said pilot valve assembly is open; and, a separate passage communicating continuously between said sensing chamber and said outlet chamber whereby the range of fluid pressure in the outlet chamber will be reflected in the sensing chamber automatically to adjust the length of the flush cycle time.

* * * * *